Patented Feb. 25, 1930

1,748,331

UNITED STATES PATENT OFFICE

MAX ENGELMANN, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF PRODUCING ORGANIC MERCURY COMPOUNDS

No Drawing.    Application filed April 15, 1927.    Serial No. 184,186.

This invention relates to mercurized organic compounds and more particularly to mercurized phenol compounds.

The usual method of mercurizing organic compounds consists of heating organic derivatives with a water or alcoholic solution of organic or inorganic mercury salts. When mercury salts having the tendency to form basic compounds are used, the common practice is to add an excess of acid. The mercurizing of a phenol according to previously known processes may be illustrated by the following formula:—

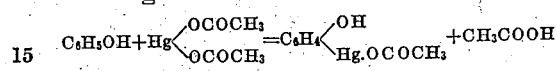

According to the above method, one-half of the acetic acid is set free. This acid is practically lost, and increases the solubility of the mercurial, which necessitates an additional step in the process to recover the product from the mother liquor.

Furthermore, according to the old method the process starts with a complete solution of the mercury salt, the reaction runs very fast, and the mercury product resulting therefrom is very often formed as a sticky and lumpy mass that is changed in the course of the reaction to a solid product, which is converted, after drying to a fine powder by grinding.

I have now found that mercurized organic derivatives may be produced by a new process which consists in treating organic compounds in water, or in an organic solvent, such as alcohol or the like, with mercury oxide and an amount of acid less than that theoretically required to form the normal mercury salt. Instead of a mixture of mercury oxide and acid, a basic salt, or a normal salt in which the acid is partly neutralized, can also be used. This new process of preparing an organic mercury compound has the advantage that the reaction is carried out in the presence of a very fine precipitate, namely, the mercury oxide or the basic salt. This causes the formation of the mercury compound in very small crystals which can be easily worked up to fine powders suitable for the dusting of seeds and plants for the purpose of controlling fungi diseases.

The product produced according to my process consists of fine crystalline material and does not require grinding to convert it to a powder. The following example is given as an illustration of the product produced according to my process but it is to be understood that this in no way is to be taken as a limitation of my invention.

47.5 parts of mercury oxide are suspended in 300 parts of water; 14 parts of glacial acetic acid are added, and the entire charge heated to 85° C. Only a part of the oxide goes into solution. 17.5 parts of orthochlorphenol are added over a period of about 2 hours. The indicated temperature is then maintained for one hour longer. The reaction is finished when the precipitated mercury compound is entirely soluble in diluted sodium hydrate solution. The charge is then filtered and dried. The mercury compound thus formed is a mixture of mono- and dimercurized chlorphenol with about 63% of mercury. It is insoluble in water, very slightly soluble in alcohol, insoluble in benzol, ether and other organic solvents. It is easily soluble in sodium or potassium hydrate solutions. It is stable to sulfuric acid, nitric acid, etc. Boiling hydrochloric acid decomposes it to chlorphenol and mercury bichloride.

The acetic acid in this reaction can be substituted by any other acids whose mercury salts are suitable for mercurizing organic compounds. The chlorphenol may be substituted by other phenols such, for e. g, as nitrophenol, or nitrocresol, and by other organic compounds which are qualified to react with mercury salt to form the organic metal derivatives.

This process may be applied either to pure organic compounds or to mixtures of isomers such as the ortho- and para-chlorphenols, or to such materials as the crude nitro- or chlorphenols.

As many apparently widely different embodiments in this invention may be made without departing from the spirit thereof, it is to be understood that I do not limit myself to the foregoing example or description except as indicated in the following patent claims.

I claim:—

1. The process of producing a mercurized phenol which comprises reacting upon a phenolic compound with basic mercuric acetate.

2. The process of producing a mercurized phenol which comprises reacting upon a phenolic compound with mercury oxide in the presence of an amount of acetic acid less than that required to form the normal mercury salt.

3. The process of producing a mercurized chlorphenol which comprises reacting upon a chlorphenol with basic mercuric acetate.

4. The process of producing a mercurized chlorphenol which comprises reacting upon a chlorphenol with mercury oxide in the presence of an amount of acetic acid less than that required to form the normal mercury salt.

5. The process of producing ortho-chlorphenol mercury which comprises reacting upon ortho-chlorphenol with basic mercuric acetate.

6. The process of producing ortho-chlorphenol mercury which comprises reacting upon ortho-chlorphenol with mercury oxide in the presence of an amount of acetic acid less than that required to form the normal mercury salt.

7. The process of producing mercurized chlorphenol compounds which comprises reacting upon a mixture of ortho- and para-chlorphenol with basic mercuric acetate.

8. The process of producing mercurized chlorphenol compounds which comprises reacting upon a mixture of ortho- and para-chlorphenol with mercury oxide in the presence of an amount of acetic acid less than that required to form the normal mercury salt.

9. The process of producing mercurized chlorphenol compounds which comprises reacting upon a mixture of crude ortho- and para-chlorphenol with mercury oxide in the presence of basic mercuric acetate.

10. The process of producing mercurized chlorphenol compounds which comprises reacting upon a crude mixture of ortho- and para-chlorphenol with mercury oxide in the presence of an amount of acetic acid less than that required to form the normal mercury salt.

11. The process of producing mercurized chlorphenol compounds which comprises reacting upon crude chlorinated phenol with mercury oxide in the presence of an amount of acetic acid less than that required to form the normal mercury salt.

In testimony whereof I affix my signature.

MAX ENGELMANN.